Dec. 25, 1951     R. D. BERGMAN     2,579,644
SURVEYING TARGET
Filed Feb. 9, 1948
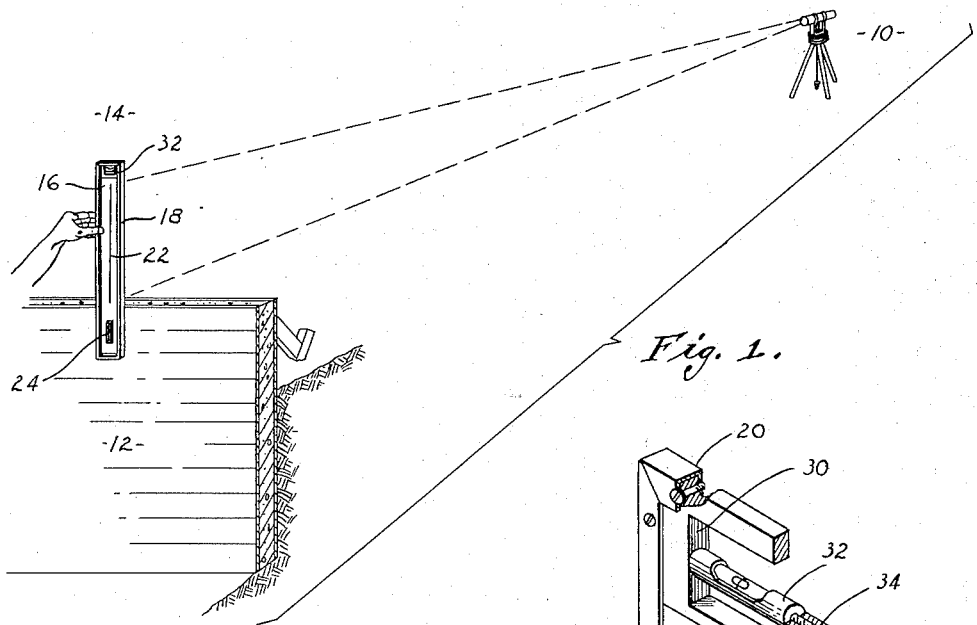
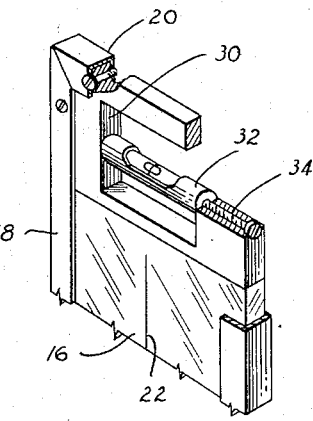
Fig. 1.
Fig. 3.
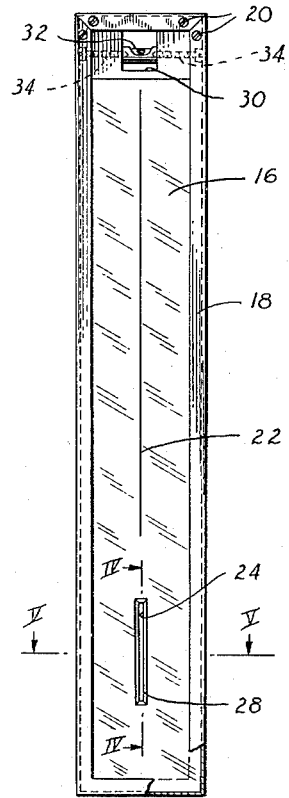
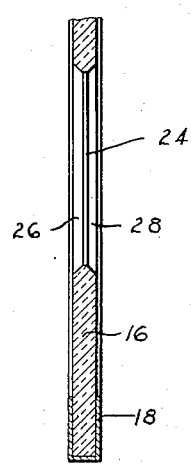
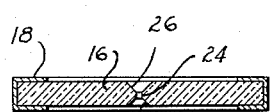
Fig. 5.
Fig. 2.
Fig. 4.
INVENTOR.
Raymond D. Bergman
BY
ATTORNEY Patented Dec. 25, 1951

2,579,644

UNITED STATES PATENT OFFICE 2,579,644

SURVEYING TARGET

Raymond D. Bergman, Long Beach, Calif.

Application February 9, 1948, Serial No. 7,257

1 Claim. (Cl. 33—74)

This invention has to do generally with the field of civil engineering and more particularly to an engineering instrument capable of assisting the surveyor in transferring a line, for example the center line of a foundation to the inside of the foundation forms that are not ordinarily visible to the worker using a surveyor transit.

The most important object of this invention is to provide an engineering instrument constituting a relatively flat, elongated, transparent panel having superimposed thereon a long, thin, relatively dark line which may be easily seen by the surveyor using a transit for the purpose of transferring certain designated lines.

Another important object of this invention is the provision of an engineering instrument of the character above mentioned wherein the transparent panel is provided with an elongated slot interposed on the thin, dark line whereby the operator may make a mark through use of a pencil or the like to indicate the line transferred by use of the instrument.

A still further object of this invention is a provision of a level mounted within the panel itself to permit the operator to dispose the thin line in a directly vertical position during use of the instrument.

Other objects will be made clear or become apparent during the course of the following specifications, reference being had to the accompanying drawings, wherein:

Figure 1 is a perspective view of an engineering instrument made in accordance with my present invention showing the same in operative use on a foundation or the like and associated with a conventional surveyor's transit.

Fig. 2 is a side elevational view of the instrument per se.

Fig. 3 is an enlarged fragmentary perspective view of one end of the instrument, parts being broken away to reveal details of construction.

Fig. 4 is a fragmentary detailed cross-sectional view taken on line IV—IV of Fig. 2, and Fig. 5 is a transverse cross-sectional view taken on line V—V of the Fig. 2.

One of the most difficult problems experienced by surveyors or construction engineers lies in the transfer of certain designated lines from one point to another, particularly where the line to be transferred and the point to which such line is to be moved or measured are not visible to the operator of the surveyor's transit. Present methods of making such transfers result in frequent errors and are generally time consuming.

It will readily become apparent that through use of the instrument about to be described such possibility of error in establishing center line or the like will be reduced to a minimum and the instrument will constitute a great labor-saving device.

Referring to the drawing and particularly Fig. 1 thereof a transit of the conventional character is broadly designated by the numeral 10. For purposes of illustration Fig. 1 also shows a foundation 12 with which the instrument broadly designated by the numeral 14 and about to be described is used. This instrument 14 constitutes a sectional body including a flat, transparent panel 16 that is shown in the drawing to be elongated in character, although a precise shape thereof is deemed to be immaterial. This panel 16 may be made from any suitable material such as glass, plastic, or the like and is disposed within the polygonal frame 18 that is U-shaped in cross section as clearly indicated by Figs. 4 and 5 to the end that this framework overlaps and protects virtually all of the marginal edges of the panel 16.

The plurality of screws, rivets, bolts, or the like 20 passing through the legs of the various sections forming the framework 18 will through suitable openings within the panel 16 rigidly secure this framework 18 to panel 16. A line 22 is formed on at least one face of the panel 16. This line is relatively thin and may be placed thereon by painting, inscribing, or any of the well known methods and is preferably of a dark color, to the end that the same may be readily seen by the user of transit 10. Line 22 extends longitudinally and substantially along the entire length of the panel 16, as is clearly illustrated in Figs. 1 and 2.

It is also preferred that line 22 be spaced midway between the longitudinal edges of the panel 16. An elongated slot 24 formed in the panel 16 adjacent one end thereof is disposed directly on the line 22 to the end that the longitudinal axis of the slot 24 is directly in line with the dark colored mark 22. As shown in Figs. 4 and 5 of the drawing, the panel 16 is bevelled as at 26 and 28 to form a slot 24 thereby facilitating insertion of a pencil, or the like into such slot 24.

That end of the panel 16 opposite to the slot 24 thereof has an opaque block abutting the same, said block having a cavity 30 formed therein wherein is disposed level 32. The frame 18 that overlaps the marginal edges of panel 16 also overlaps and protects the marginal edges of said block. This level 32 extends transversely of the panel 16 and is held in place within the cavity 30 through the medium of opposed screws, or the like 34.

When the instrument 14 is placed in use in the manner illustrated in Fig. 1 of the drawing, same is held by an operator on the face of the foundation 12 upon which a line transfer is to be made. The instrument 14 may be positioned with line 22 thereof directly vertical either by directions from the operator of the transit 10 or through use of the level 32. The operator of instrument 14 may then be instructed as to movement of instrument 14 along foundation 12 by the operator of transit 10.

When the correct position has been determined, a line can be easily inscribed upon foundation 12 by use of a pencil inserted through slot 24. Thus, a center line of a foundation, or a group of foundations, may be easily transferred to the inner face of the foundation forms that are invisible to the operator of transit 10. When the instrument 14 is plumbed by use of the level 32 on the approximate line, the operator of transit 10 can motion instrument 14 on the precise line desired by sighting toward the thin dark line 22 of the panel 16. When this line 22 coincides with the vertical crosshair of transit 10, the mark made by the operator of instrument 14 will not only be on the exact center line desired but will be absolutely vertical.

Manifestly many changes and modifications may be made, particularly with respect to details of construction without departing from the spirit of this invention as defined by the scope of the appended claim.

Having thus described the invention, what is claimed as new and desired to be secured by Letters Patent is:

A surveying target comprising an elongated, transparent panel having a single, median hair line thereon and extending longitudinally thereof, and an elongated marking guide slot near one end of the panel in alignment with said hair line; an opaque block on the opposite end of the panel and provided with a polygonal opening; a peripheral frame for the panel and the block, said frame being U-shaped in cross-section, presenting opposed legs overlapping the marginal edges of the panel and the block; and plumbing means including a tubular, bubble indicator secured to the block within said opening, perpendicular to said line and centered with respect thereto.

RAYMOND D. BERGMAN.

REFERENCES CITED

The following references are of record in the file of this patent:

UNITED STATES PATENTS

| Number | Name | Date |
|---|---|---|
| 284,513 | Tebar | Sept. 4, 1883 |
| 340,702 | Craven | Apr. 27, 1886 |
| 685,455 | Kinkead | Oct. 29, 1901 |
| 1,660,833 | Cronjaeger | Feb. 28, 1928 |
| 1,827,049 | Tenney | Oct. 13, 1931 |

FOREIGN PATENTS

| Number | Country | Date |
|---|---|---|
| 352,254 | Great Britain | July 9, 1931 |
| 546,860 | Germany | Mar. 17, 1932 |